US011416697B2

(12) United States Patent
Stefanini et al.

(10) Patent No.: US 11,416,697 B2
(45) Date of Patent: Aug. 16, 2022

(54) INDUCTIVE AIMING TRIGGER

(71) Applicant: Datalogic IP Tech S.r.l., Calderara di Reno (IT)

(72) Inventors: Simone Stefanini, Bologna (IT); Mauro Pecorari, Porto Potenza Picena (IT); Davide Gavioli, San Vito di Spilamberto (IT); Roberto Moschini, Bologna (IT)

(73) Assignee: DATALOGIC IP TECH S.R.L., Calderara di Reno (IT)

( * ) Notice: Subject to any disclaimer, the term of this patent is extended or adjusted under 35 U.S.C. 154(b) by 0 days.

(21) Appl. No.: 17/133,214

(22) Filed: Dec. 23, 2020

(65) Prior Publication Data
US 2022/0198165 A1 Jun. 23, 2022

(51) Int. Cl.
*G06K 7/10* (2006.01)
(52) U.S. Cl.
CPC ...... *G06K 7/10881* (2013.01); *G06K 7/10811* (2013.01); *G06K 2207/1011* (2013.01); *G06K 2207/1013* (2013.01)
(58) Field of Classification Search
CPC .......... G06K 7/10821; G06K 7/10881; G06K 2007/10524; G06K 2207/1011
USPC .............................. 235/462.2, 462.48, 472.01
See application file for complete search history.

(56) References Cited

U.S. PATENT DOCUMENTS

| 5,059,778 A * | 10/1991 | Zouzoulas | G06K 7/10881 |
| | | | 382/313 |
| 9,117,129 B1 | 8/2015 | Koch | |
| 2007/0057067 A1* | 3/2007 | He | G06K 7/10851 |
| | | | 235/462.21 |
| 2008/0129532 A1 | 6/2008 | Bellows | |
| 2015/0178539 A1 | 6/2015 | Gerst et al. | |

FOREIGN PATENT DOCUMENTS

| EP | 3 188 138 A1 | 7/2017 |
| WO | WO-2016/126334 A1 | 8/2016 |

OTHER PUBLICATIONS

Texas Instruments; TI Designs; 16-Button Keypad Using the LDC1314 Inductance-to-Digital Converter, www.ti.com; dated Jul. 2015—Revised Jun. 2016, 29 pages.
EP Communication in EP Pat. Appl. No. 21215412.4 dated May 17, 2022, 5 pgs.

* cited by examiner

Primary Examiner — Suezu Ellis
(74) Attorney, Agent, or Firm — Foley & Lardner LLP

(57) ABSTRACT

A handheld code reader may include a main structure, a handle extending from the main structure, and a trigger configured to be pulled by a finger of a user holding the handle. The code reader may further include a conductive element, an antenna configured to sense an inductive change caused by the trigger moving the conductive element, and electronics in electrical communication with the antenna, the electronics configured to determine when the inductive change is indicative of a user selecting to activate a pre-trigger aiming function.

20 Claims, 8 Drawing Sheets

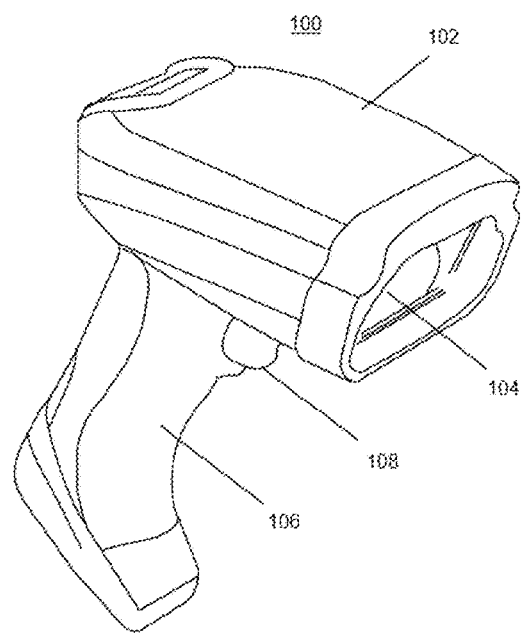
Fig. 1
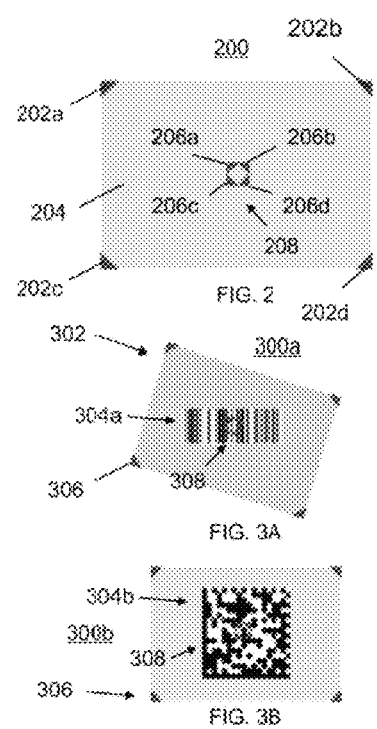
FIG. 2
FIG. 3A
FIG. 3B

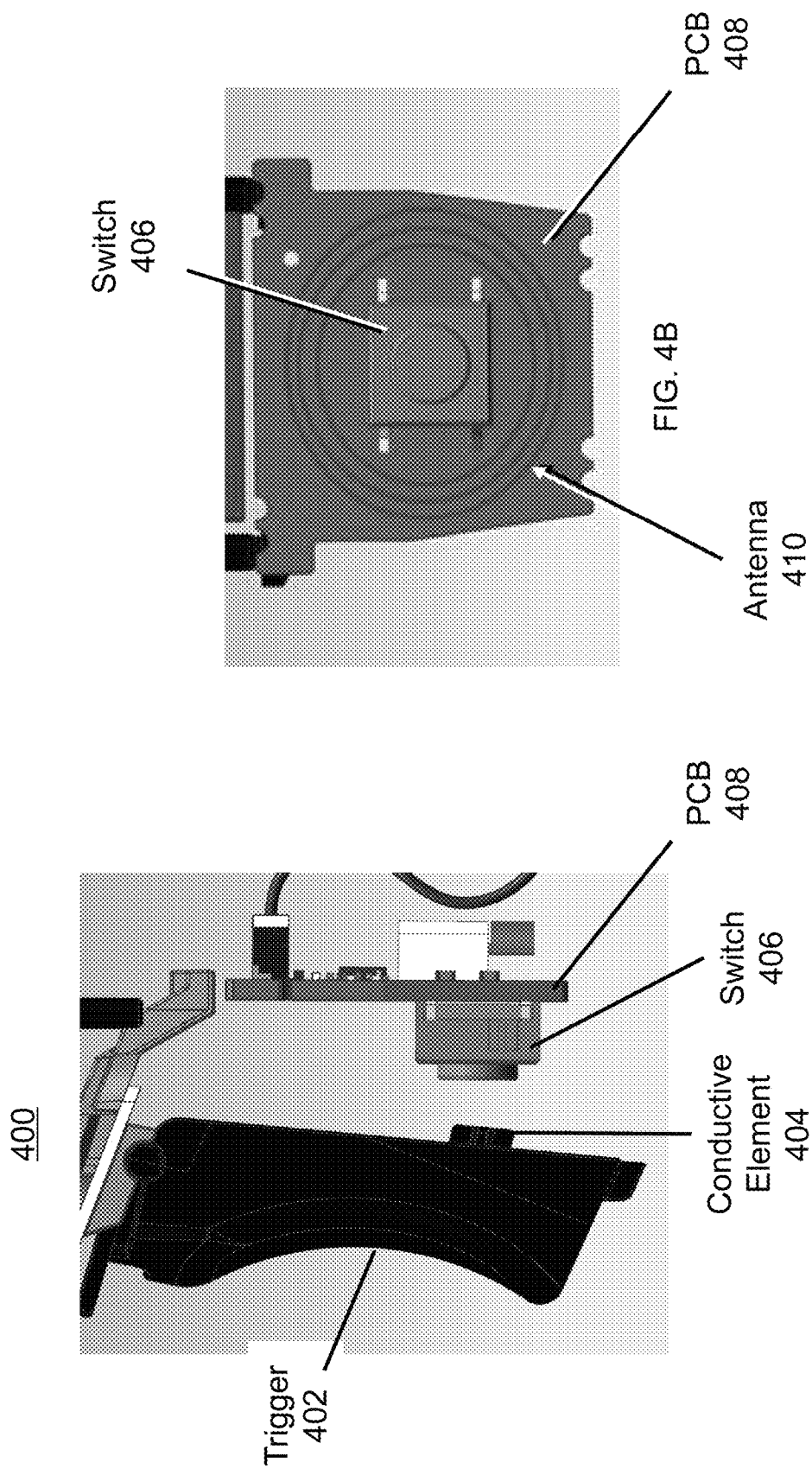

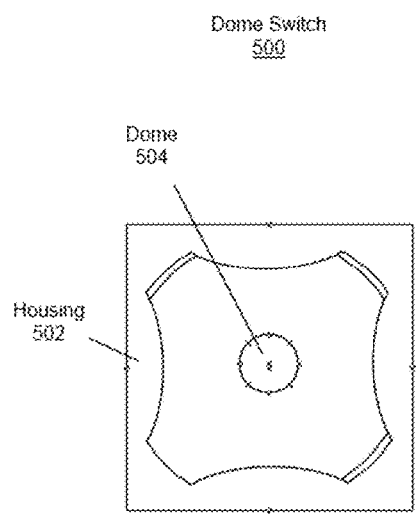
Fig. 5
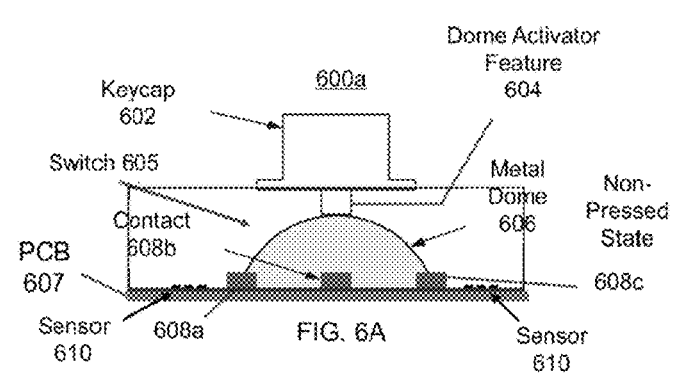
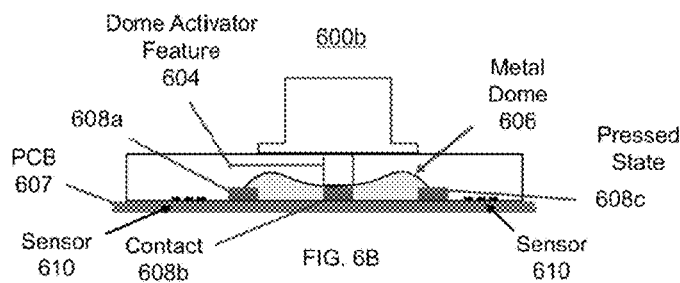

INDUCTIVE AIMING TRIGGER

BACKGROUND

Handheld barcode readers or code readers are often in the form of a "gun" in which electro-optics are used to perform scanning or imaging machine-readable indicia (e.g., barcodes, QR codes, or other code formats). Other mobile barcode readers or portable data terminals are gun shaped by having a mount positioned on a handle with a trigger that causes the mobile barcode reader to perform barcode reading functions in the same or similar manner as an integrated barcode reader. To assist a user of the code reader in imaging the machine-readable indicia, the code reader may be configured to perform a pre-trigger aiming function, such as outputting an aiming pattern, such as an illumination in the shape of a frame or corners defining a frame with a central feature, so that the user of the code reader may more easily see where he or she is aiming the reader, thereby reducing time for performing code reading.

Conventional code readers use a number of different mechanisms to sense when the user attempts to activate the pre-trigger aiming function. One such mechanism includes the use of a photocell contained in a plastic seat with an electromechanical switch that is rotated 90 degrees relative to the axis of a plunger of a trigger of the code reader. One problem with such a configuration is that precision of the alignment with the photocell is difficult given that the parts used to position the photocell include (i) plastic parts, (ii) rubber parts, (iii) an electro-mechanical switch, and (iv) printed circuit board (PCB) dimensions. In other words, mechanical tolerances and assembly of the components, and due to the aging, often limit reliability in activation of the pre-trigger aiming function. Moreover, and electro-mechanical switch physically aligned with the trigger plunger and the photocell sensor has some drawbacks, including (i) increased internal dimensions for a housing of the photocell, (ii) need for an additional PCB slot, and (iii) increased complexity of molds to produce a housing and pre-trigger aiming sensing components to incorporate the pre-trigger aiming function. As such, there is a need for a more reliable mechanism for initiating a pre-trigger aiming function that has fewer components and increased reliability.

BRIEF SUMMARY

To provide for an improved pre-trigger aiming function, a contactless inductive pre-trigger configuration may be utilized. The inductive pre-aiming trigger may be configured within electro-magnetic sensor and conductive element that, when moved by a user moving a trigger of the handheld code reader, is sensed by the electro-magnetic sensor. The sensor may sense an inductive change that causes the electronics to initiate a pre-trigger aiming function, such as generating a pre-trigger aiming pattern, to assist a user in imaging a machine-readable indicia.

One embodiment of a handheld code reader may include a main structure and electro-optics positioned at the main structure. The electro-optics may be configured to image or scan machine-readable codes. A handle may extend from the main structure, and may be configured to enable a user to grip the handle to operate the code reader. Electronics may be configured to cause the electro-optics to perform (i) a pre-trigger aiming function and (ii) a code reading function. A trigger may be configured to be pulled toward the handle by the user. An antenna may be in electrical communication with the electronics, and be configured to sense an inductive change caused by the user pulling the trigger from a resting position toward a pre-trigger aiming function position. A switch may be in electrical communication with the electronics, and be positioned to be activated by the trigger being pulled to a scan position.

One method of operating a code reader may include sensing an inductive change during operation of a trigger of the code reader, and, in response to determining that the inductive change crosses a pre-trigger inductive threshold level, performing a pre-trigger aiming function.

Another embodiment of a handheld code reader may include a main structure, a handle extending from the main structure, and a trigger configured to be pulled by a finger of a user holding the handle. The code reader may further include a conductive element, an antenna configured to sense an inductive change caused by the trigger moving the conductive element, and electronics in electrical communication with the antenna, the electronics configured to determine when the inductive change is indicative of a user selecting to activate a pre-trigger aiming function.

BRIEF DESCRIPTION OF THE DRAWINGS

Illustrative embodiments of the present invention are described in detail below with reference to the attached drawing figures, which are incorporated by reference herein and wherein:

FIG. 1 is an illustration of an illustrative handheld code reader inclusive of a pre-trigger aiming function initiated by inductive sensing;

FIG. 2 is an illustration of an illustrative pre-trigger aiming pattern that aids a user in imaging a machine-readable indicia;

FIG. 3A is an illustration of the pre-trigger aiming pattern of FIG. 2 displayed on a linear code or one-dimensional code, such as a conventional barcode;

FIG. 3B is an illustration of the pre-trigger aiming pattern of FIG. 2 displayed on a two-dimensional code, such as a QR code;

FIG. 4A is an illustration of an illustrative trigger portion of a code reader;

FIG. 4B is an illustration of a printed circuit board on which a switch is disposed in proximate relation to an antenna disposed on the PCB;

FIG. 5 is an illustration of an illustrative dome switch that may be utilized to initiate an imaging function and, optionally, pre-trigger aiming function in accordance with the principles described herein;

FIGS. 6A and 6B are illustrations of a switch including a metal dome, where a key cap may be in a first position in FIG. 6A and in a second position in FIG. 6B, and wherein a pre-trigger aiming function may be initiated by a conductive feature moving between the first and second positions;

DETAILED DESCRIPTION OF THE DRAWINGS

Figure 4C:
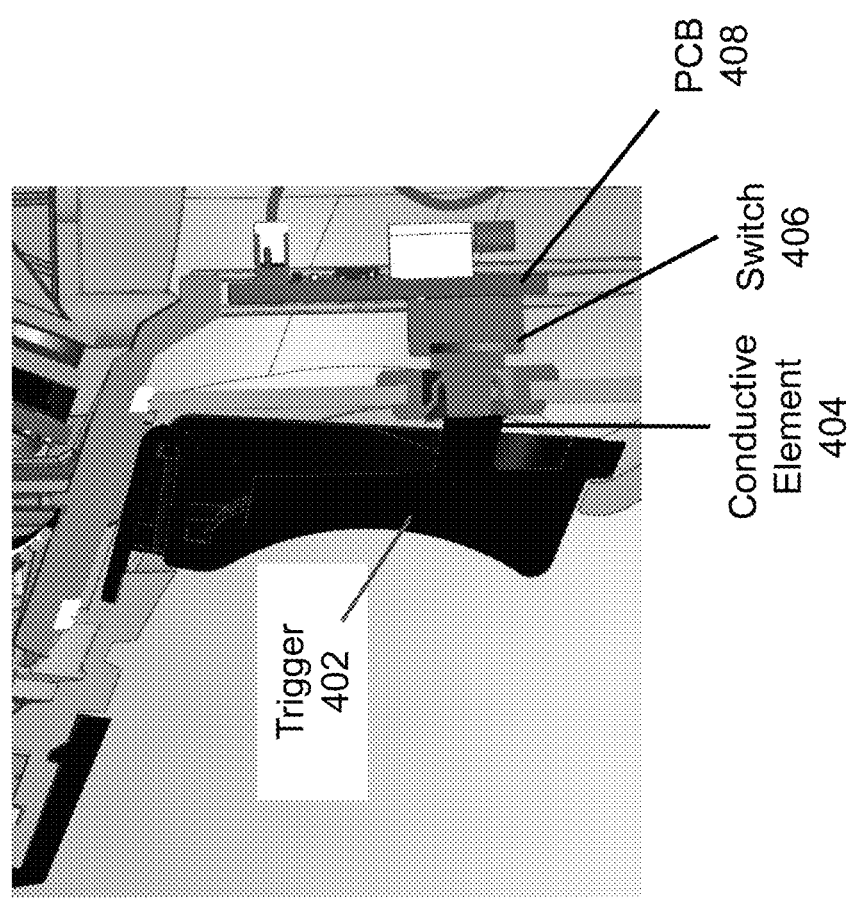
FIG. 4C is an illustration of the trigger portion in a read position in which the trigger causes a switch to be activated.

With regard to FIG. 1, an illustration of an illustrative handheld code reader 100 inclusive of a pre-trigger aiming function initiated by inductive sensing is shown. The code reader 100 includes a main structure 102 with a window 104 via which optics (not shown) are able to scan or image machine-readable indicia (e.g., barcode, QR code, or other machine-readable code). The main structure 102 is shown as a housing, but the main structure may alternatively be a holder configured to enable a mobile device, such as a mobile barcode scanner in the shape of a smartphone, for example, to be secured thereby. For example, the main structure 102 may alternatively include a flat surface on which a mobile device is placed and secured by sides extending upwards from the flat surface that are shaped to secure the mobile device to the flat surface. The handle 106 may be connected to the main housing 102, and be configured to house electronics for performing code reading and pre-trigger aiming functionality, as described further herein. A trigger 108 may be positioned near a top portion of the handle 106 just beneath the main body 102, and be configured to enable a user to transition the trigger 108 between a resting position and a read position, where the read position causes the code reader to capture an image of a machine-readable indicia, as further described herein. In addition, in accordance with the principles provided herein, a pre-trigger aiming function may be initiated in response to the trigger causing an inductive change to occur, as further described herein.

With regard to FIG. 2, an illustration of an illustrative pre-trigger aiming illumination pattern 200 that aids a user in imaging a machine-readable indicia is shown. The pre-trigger aiming illumination pattern 200 is shown to include first illumination features 202a-202d (collectively 202) that define a rectangle shape 204 along with second illumination features 206a-206d (collectively 206) defining a square shape 208 located in a center region of the rectangular shape 204. It should be understood that alternative pre-trigger aiming illumination patterns may be utilized, such as a plus-sign (+) disposed in a center region of the rectangle shape 204, lines to define outside regions of the rectangle shape 204, or any other shapes that defined corners, edges, or inner portions of a region that the code reader will image during operation of the code reader. In an embodiment, the pre-trigger illumination pattern 200 may include the rectangle shape 204 or other shape only, inside square shape 208, or other shape only.

With regard to FIGS. 3A and 3B, illustrations of scenes 300a and 300b in which a pre-trigger aiming pattern 302 is displayed on a linear code or one-dimensional code 304a, such as a conventional barcode, and a two-dimensional code 304b, such as a QR code, is shown. Aiming light source(s) may any illumination source, including LED or laser. The pre-trigger aiming pattern 302 may include only center features (e.g., a simple spot, for example) or only perimeter-defining features, or both, as further described herein. The pre-trigger aiming pattern 302 may include perimeter-defining illumination features 306 and center feature 308, as provided in FIG. 2. The perimeter-defining illumination features 306 may be used to aid a user imaging the code 304a being read, and the center illumination feature 308 may show that the code reader is aiming centrally at the code 304a. Similarly, the two dimensional code 304b is fully encompassed within the rectangle defined by the perimeter-defining illumination features 306, and the center illumination feature 308 is centrally located on the 2D code.

With regard to FIG. 4A, an illustration of an illustrative trigger portion 400 of a code reader is shown. A trigger 402 is shown in a resting position or state, and may include a conductive element 404 attached thereto. The conductive element 404 may be formed of any material that may be sensed by sensing magnetic field distortion by an inductive sensor. Although the conductive element 404 may be disposed on the trigger 402, alternative positions of the conductive element 404 may be utilized. Moreover, the conductive element 404 may be integrated into another component relative to the inductive sensor.

A switch 406 may be mounted to a printed circuit board (PCB) 408, configured to be depressed by the trigger 402. The switch 406 may be an electromechanical switch or other type of switch that is mechanically activated by the trigger 402. The PCB 408 may be positioned within a cavity defined by a handle of the code reader, and define a rigid support for the switch 406 such that the switch 406 has minimal or no compliance relative to the trigger 402 when being operated by a user. By having minimal or no compliance, the code reader may be more robust over time as the amount of force needed to cause the code reader to perform reading functions may remain constant over time a warping or other elastic deformation of the support for the switch 406 is less likely to occur.

With regard to FIG. 4B, an illustration of the PCB 408 on which the switch 406 is coupled in proximate relation to an antenna 410 disposed on the PCB 408 is shown. The antenna 410 may be a circular antenna that encircles the switch 406. In an embodiment, the antenna 410 may include multiple, concentric circular antennas, as shown. The antenna 410 may be printed on the PCB 408, and be in electrical communication with processing electronics (see, for example, FIG. 7) that are capable of processing signals, in this case magnetic field distortion signals or inductive change signals sensed by the antenna 410. Although the antenna 410 may be formed by circular antennas, it should be understood that alternative antenna shapes may be utilized. It should further be understood that rather than the antenna 410 being positioned on the PCB 408, the antenna 410 may be positioned elsewhere and be capable of sensing an inductive change resulting from a user moving the trigger 402 that causes a conductive element to move. For example, an antenna may be positioned on or in the trigger 402 and a conductive element may be positioned in relative position to the trigger 402. Alternatively, the antenna 410 may be positioned on or in the main housing of the code reader. By applying the antenna 410 on the PCB 408, space and cost is saved by not having an extra PCB as when an optical sensor for sensing position of the trigger 402 as has been previously utilized.

With regard to FIG. 4C, an illustration of the trigger portion 400 with the trigger 402 in a read position in which the trigger 402 causes a switch to be activated is shown. As configured, a trigger plunger or the conductive element 404 may depress the switch 406 mounted to the PCB 408. In operation, as the trigger 402 is pulled from the resting state (FIG. 4A) to the image state (FIG. 4C), the conductive element 404 moves through a variation of inductance, thereby enabling the antenna 410 to sense an inductive change.

Figure 7:
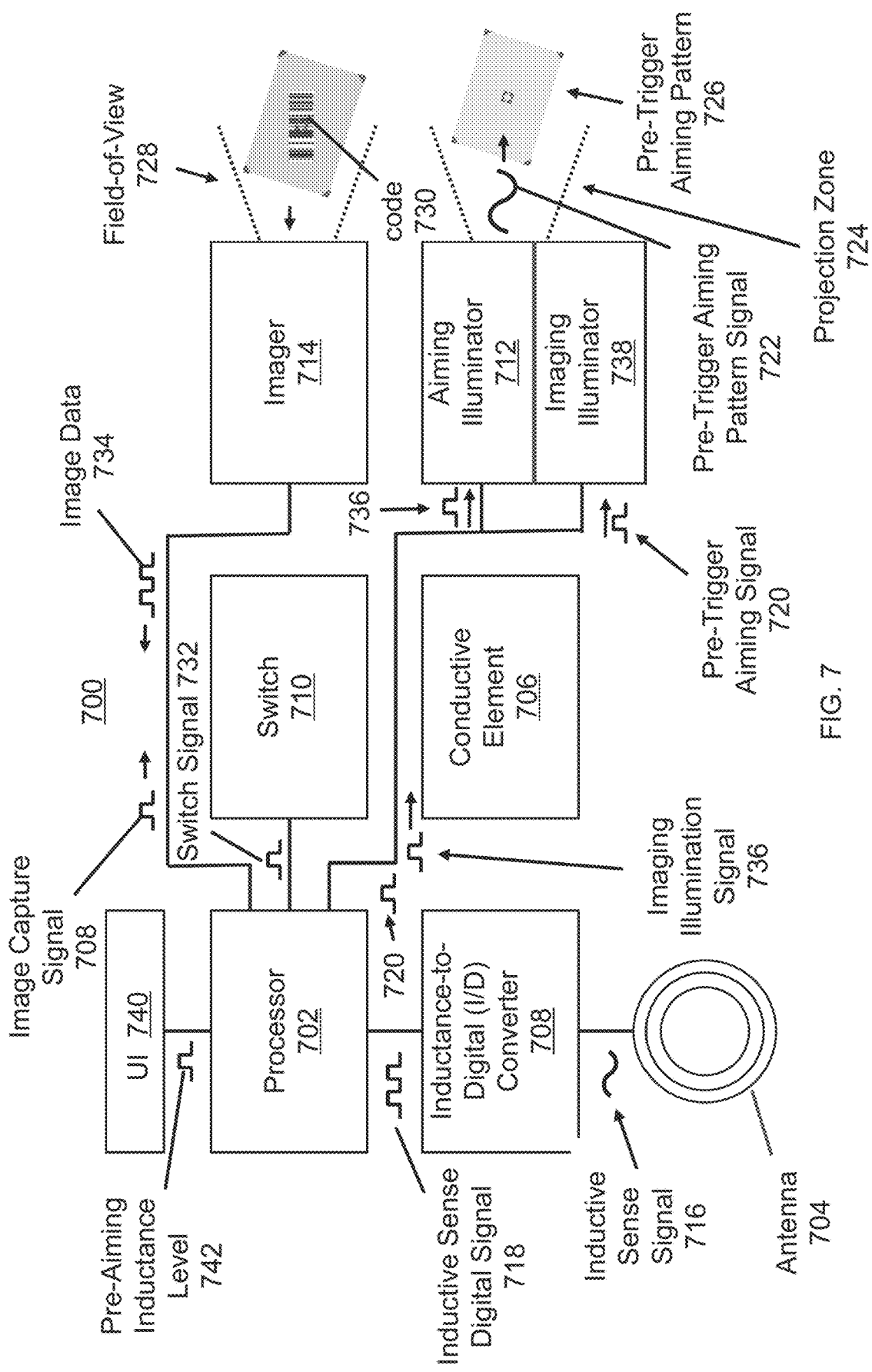
FIG. 7 is an illustration of a set of electronic and electro-optic components for use in performing and inductive pre-trigger aiming function.

More particularly, the inductive sensing may be performed using a high-resolution, high-speed inductive-to-digital converter (see FIG. 7). The inductive sensing may be designed for a number of different functions and/or applications to be performed by the code reader based on the inductivity measurements. It is possible to detect position, rotation, or motion of an object, such as the trigger 402. The converter allows both inductance and impedance to be measured. Featuring a wide inductor-capacitor (LC) sensor frequency range, a broad range of conductive materials of the conductive element 404 may be sensed. By using inductive sensing, inherently accurate and robust sensing, even in harsh industrial environments, may be utilized.

With regard to FIG. 5, an illustration of an illustrative dome switch 500 that may be utilized to initiate an imaging function and, optionally, pre-trigger aiming function in accordance with the principles described herein is shown. The dome switch 500 may include a housing 502 and dome 504. The dome 504 may be a flexible material, such as a flexible metal, so as to be able to be repetitively deformed without permanently damaging the dome shape. In an embodiment, the dome 504 may be conductive, and be utilized to be sensed by an inductive sensor, as further described in FIGS. 6A and 6B.

With regard to FIGS. 6A and 6B, illustrations of switch assembly 600a in a non-pressed state and switch assembly in a pressed state are shown. The switch assembly 600a may include a keycap 602 that includes a dome activator feature or key 604 that protrudes from a bottom surface of the keycap 602 so as to engage a dome switch 605 and depress a metallic dome 606 of the dome switch 605 mounted to a PCB 607. In an embodiment, in the non-pressed state, the dome activator feature 604 may contact or be slightly above the dome 606, but not deform the dome 606, and in the pressed state, the dome activator feature 604 may deform the dome and cause the dome to be pressed into a contact 608b of contacts 608a-608c so as to activate the switch 605. In an embodiment, the switch assembly 600a may include the keycap 602 and switch 605 in a common package. Alternatively, the keycap 602 may be positioned on a trigger of a code reader and aligned with the dome 606 of the switch 605 so that when the trigger is pulled to an image trigger position, the dome activator feature 604 of the keycap 602 deforms the dome 606, thereby causing a pre-trigger aiming function to be initiated, as described below. When the dome 606 is deformed to be in an image activation state, the dome 606 contacts the contact 608b, to cause a circuit to be completed and an electrical signal to be communicated to a processor to initiate an image capture, for example, by the code reader.

As further shown, an inductive change sensor or antenna 610 may be printed on, mounted to, or positioned at a PCB 612 on which the switch 605 is mounted. The antenna 610 may be a circular antenna, such as the antenna 410 of FIG. 4B. In this embodiment, rather than having a separate conductive element positioned on the trigger, such as shown in FIG. 4A, the metal dome 606 of the dome switch 605 may be utilized as the conductive element. That is, as the metal dome 606 is deformed, an inductive change may be sensed by the antenna 610. The shape, size, and spacing of the antenna 610 relative to the dome switch 605 may vary depending on the desired sensitivity, which may be a function of an antenna pattern produced by the antenna 610. As understood in the art, different antenna designs may produce different antenna patterns.

As previously described, by using the antenna 610 capable of high-resolution and high-precision measurement of a magnetic field distortion within an antenna pattern (i.e., sensing region), it is possible to avoid using a conductive element on the trigger, such as the conductive element 404 of FIG. 4A, and directly detect deformation of the conductive metallic dome 606 inside the switch 605 mounted on the PCB 607. That is, even a micrometric deformation of the metallic dome 606 inside the switch 605 mounted on the PCB is enough to be detected by sensor electronics with sufficient gain and signal-to-noise ratio.

With a regard of FIG. 7, a block diagram of an electrical system 700 including a set of electronic, electro-optic, and electromagnetic components for use in performing an inductive pre-trigger aiming function by a code reader is shown. The electrical system 700 may include electronics, including a processor 702, which may include a microprocessor, application specific integrated circuit (ASIC), and/or other electronics, configured to sense inductive changes and perform code reading functionality in accordance with the principles described herein. An antenna 704, which may be a circular antenna with one or more circular antenna elements, may be configured to sense inductive changes caused by a trigger of the code reader moving an conductive element 706. The conductive element 706 may be formed of any conductive material that may be sensed by the antenna 704.

The antenna 704 may be in electrical communication with an inductance-to-digital (VD) converter 708, which may be in electrical communication with the processor 702. The processor may further be in communication with a switch 710, aiming illuminator 712, imaging illuminator 713, and imager 714. The processor 702 may be configured to manage the functional operations of the code reader, including a pre-trigger aiming function and code imaging and decoding function.

In operation, in response to the antenna 704 sensing an inductive level and/or inductive change, an inductive sense signal 716 may be produced. The inductive sense signal 716 may be an analog signal that is dynamic to represent an inductive change or relative position of a conductive element, a sinusoidal signal in response to sensing the inductive change, or any other analog signal. The inductive sense signal 716 may be received and processed by the VD converter 708. The VD converter 708 may generate an inductive sense digital signal 708 that digitally represents the inductive sense signal 716.

The processor 702 may receive the inductive sense digital signal 718 and determine an inductive level of the corresponding inductive sense signal 716 to determine whether the inductive level is at a level to initiate a pre-trigger aiming function. In determining whether the inductive level is indicative to initiate the pre-trigger aiming function, a comparison may be made by the processor 702 between the instant inductive level and a baseline inductive level when the trigger, and consequently the conductive element 706, is in a resting state or position. The inductive sensing may be passive or active. In response to the processor 702 determining that the instant inductive level crosses a pre-trigger aiming function threshold level, the processor 702 may generate a pre-trigger aiming signal 720 to cause the aiming illuminator 712 to generate a pre-trigger aiming pattern signal 722 within a projection zone 724 to generate a pre-trigger aiming pattern 726. For example, the instant inductive level may start at 0.0 Henry (self-calibrated) at a resting state and end at 0.5 Henry at the point when a switch is activated. If a pre-trigger aiming function threshold level is set at 0.25 Henry (e.g., corresponding to 2 mm trigger pull), then the pre-trigger aiming function may be triggered when the trigger is pulled 2 mm, and the inductive level may be 0.25 Henry, which is a difference of 0.25 Henry from the resting state. The projection zone 724 may be the same or similar angle as an angle defining a field-of-view 726 of the imager 714 used to capture an image or scan a scene in which a machine-readable indicia or code 730 is positioned.

That is, the projection zone 724 is to overlap the scene within the field-of-view 726 of the imager 714.

In response to the switch 710 generating a switch signal 732 by the trigger activating the switch 710 by pressing on the switch 710, the processor 702 may generate an image capture signal 708 to cause the imager 714 to capture an image within the field-of-view 728. Similarly, in addition to the processor 702 generating the image capture signal 708, the processor 702 may generate an imaging illumination signal 736 to cause an imaging illuminator 738 to generate an illumination signal (not shown) that illuminates the code 730 being imaged. As with the pre-trigger aiming pattern signal 722, the illumination signal may have the same or similar field-of-view as the imager 714 such that the code 730 is illuminated. In an embodiment, the imaging illuminator 738 may be turned to an ON state prior to the imager 714 capturing an image so that the code 730 is illuminated prior to the imager 714 capturing an image of the code 730. The imager 714 may generate image data 734 for the processor 702 to process and decode the machine-readable indicia 730, as understood in the art.

The code reader 700 may further include a user interface 740 in electrical communication with the processor 702. The user interface 740 may include an electronic display that is touch sensitive such that a graphical user interface may be displayed for a user to set up ad operate the code reader 700. In an alternative embodiment, the user interface 740 may include electromechanical components, such as knobs, switches, or otherwise, that enable a user to set parameters, such as a pre-trigger aiming threshold level. The user interface 740 may be positioned on the code reader 700, but may also be positioned on an external device. Such external positioning of a user interface may be the case in which the code reader 700 is connected wirelessly or with cables to a personal computer or other electronic device to be configured, where the configuration options may be a pre-trigger setting option for setting responsiveness and behavior of the pre-trigger aiming function. Because some code readers do not have a user interface, enabling an external user interface to establish pre-trigger aiming or other settings may be more efficient and less costly than alternative techniques for establishing the pre-trigger aiming or other settings. In an embodiment, the user interface 740 may enable a user to select a factory setting for the pre-trigger aiming threshold level, which may have multiple selection options (e.g., low, medium, high) or allow for a user to select a level within a range.

As shown, a user may interact with the user interface 740 to select a pre-trigger aiming inductance level 742, which may be communicated from the user interface 740 to the processor 702. The code reader 700 may have a factory setting for the pre-trigger aiming threshold level as a default and be selectable or resettable to the factory setting. The pre-trigger aiming threshold level may be stored in a non-transitory memory, and accessed during operation of the code reader 700. In an alternative embodiment, rather than performing a resting-state inductance level comparison with an instant inductance, the code reader may be configured with the ability to let the user set the inductive threshold level while pulling the trigger to a desired threshold location (e.g., pull the trigger a desired amount and press a button). The processor may store the inductive value measured at the desired trigger location, and thereafter, the reader may use that stored inductive threshold level for determining an inductive change.

Figure 8:
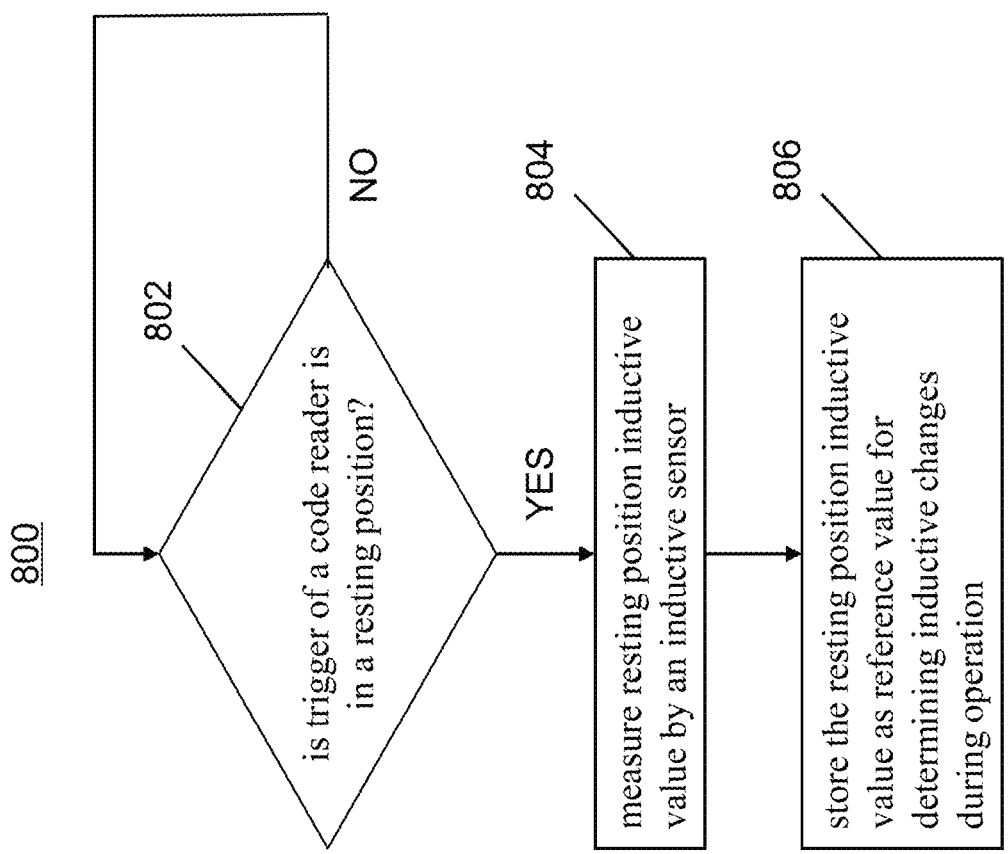
FIG. 8 is a flow diagram of a process for performing a pre-trigger aiming function by using inductive sensing by a code reader.

With regard to FIG. 8, a flow diagram of a process 800 for self-calibrating a code reader to perform a pre-trigger aiming function by using inductive sensing is shown. The process 800 may start at step 802, where a determination may be made as to whether a trigger of the code reader in a resting position. If not, then the process may repeat step 802. In being in a resting position, a user may notify the code reader (i.e., a processor of the code reader) via a user interface (e.g., touch screen, mechanical button, or otherwise) that a trigger of the code reader is in a resting position (i.e., not being pulled toward a switch). At step 804, a resting position inductive value may be measured by an inductive sensor. At step 806, the resting position inductive value may be stored in a non-transitory memory for use as a reference value for inductive changes during operation of the code reader.

As previously described, the code reader may be configured to self-calibrate in a resting position to set a base inductive value. In one embodiment, a manufacturer may set the pre-trigger inductive threshold level. The self-calibration process may be independent of establishing a pre-trigger threshold level and independent of the pre-trigger threshold level. In another embodiment, a user may set the pre-trigger inductive threshold level by allowing the user to pull the trigger to a desired position and pressing a button that causes the code reader to store a pre-trigger inductive threshold level. Alternative techniques may be utilized to enable the user to configure the pre-trigger threshold. During operation, the pre-trigger aiming function is to be initiated when the inductive change is greater than the pre-trigger inductive threshold level as offset by the resting inductive value or crosses a pre-trigger inductive value set by the user moving the trigger to a desired location.

Figure 9:
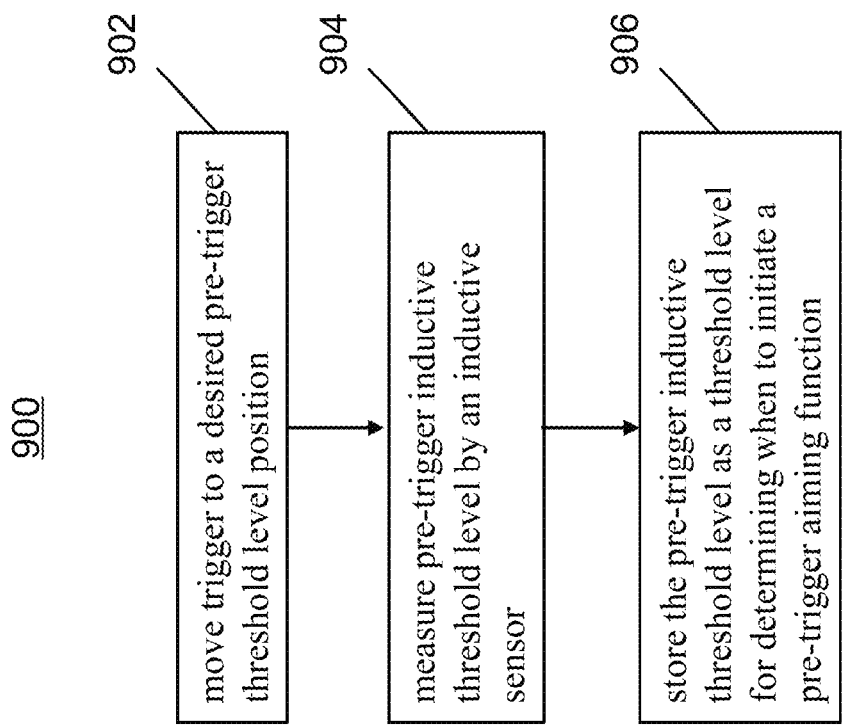
FIG. 9 is a flow diagram of a process for a user of a code reader to set a pre-trigger threshold level.

With regard to FIG. 9, a flow diagram of a process 900 for a user of a code reader to set a pre-trigger threshold level is shown. In this process 900, the pre-trigger threshold is configurable by the user. The process 900 may start at step 902, where a user moves a trigger to a desired pre-trigger threshold level position. At step 904, a pre-trigger inductive threshold level may be measured by an inductive sensor. To initiate step 904, a user may press a button or hold the trigger at a certain location for a certain time period, such as 3 seconds, if the code reader in a user calibration mode, for example. At step 906, the pre-trigger inductive threshold level may be stored at a threshold level for determining when to initiate a pre-trigger aiming function during normal operation of the code reader.

Figure 10:
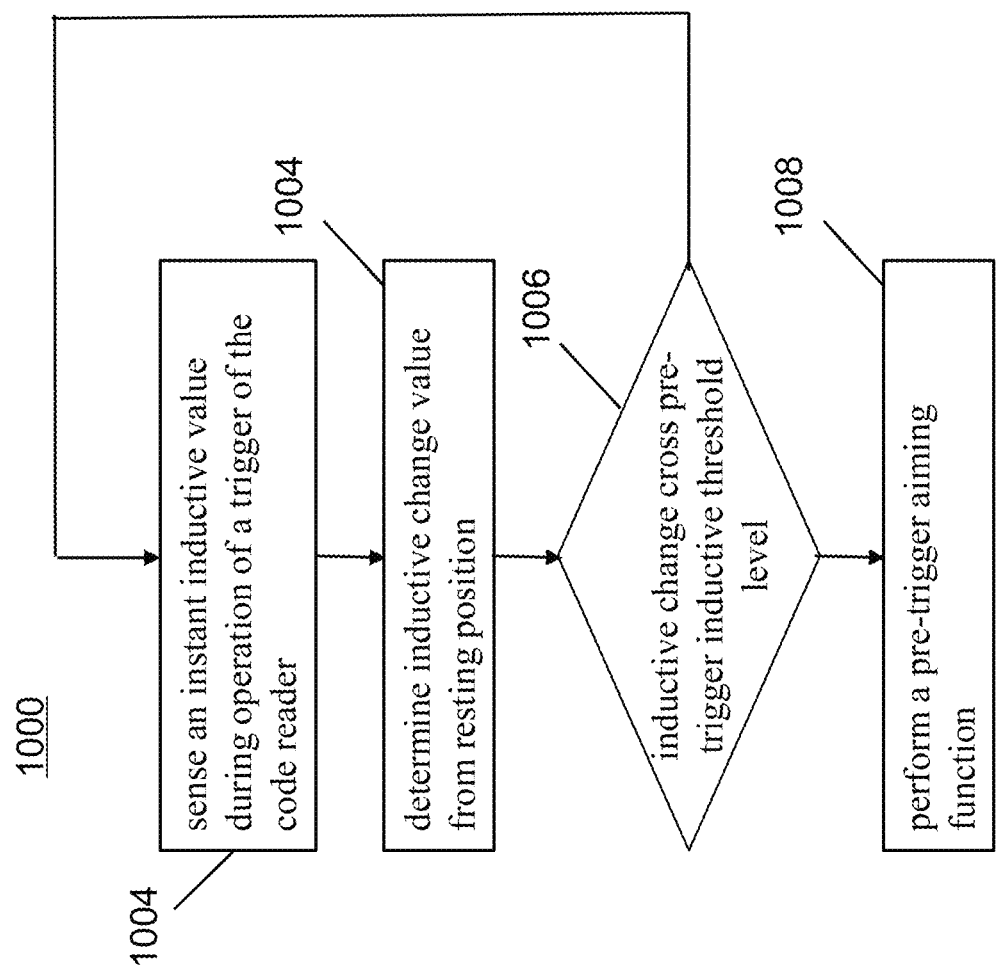
FIG. 10 is a flow diagram of a process for a code reader to perform a pre-trigger aiming function by using inductive sensing by a code reader.

With regard to FIG. 10, a flow diagram of a process 1000 for a code reader to perform a pre-trigger aiming function by using inductive sensing by a code reader is shown. The process 1000 may start at step 1002 by sensing an instant inductive value during operation of a trigger of the code reader. At step 1004, an inductive change from a resting position of the code reader may be determined. The determination may be performed by previously performing a self-calibration operation as provided in FIG. 8 or a user setting operation as provided in FIG. 9. At step 1006, a determination may be made as to whether an inductive change crosses a pre-trigger inductive threshold level. The pre-trigger inductive threshold level may be set to a minimum level that is indicative of a user intentionally moving the trigger by a certain distance (e.g., 3 mm move of the trigger). The pre-trigger inductive threshold level, for example, may be set to a corresponding inductive value that corresponds to a certain distance of movement. It should be understood that the minimum level may be set based on the type of conductive element is being sensed, type of inductive sensor, sensitivity of the inductive sensor, signal-to-noise level of the inductive sensor, resolution of an inductance-to-digital converter, or otherwise.

If at step 1006 a determination is made that the inductive change does not cross the pre-trigger inductive threshold level, then the process returns to step 1002. Otherwise, if the inductive change does cross the pre-trigger inductive threshold level, then the process may continue to step 1008, where a pre-trigger aiming function may be performed. Once such pre-trigger aiming function may include generating a pre-trigger aiming signal to display a pre-trigger aiming pattern to assist the user image a machine-readable indicia with the code reader, as previously described herein.

One embodiment of a process of operating a code reader may include sensing an inductive change during operation of a trigger of the code reader, and in response to determining that the inductive change crosses a pre-trigger inductive threshold level, performing a pre-trigger aiming function.

The process may further include sensing an inductive change by sensing an inductive change in response to an inductive device moving through an electromagnetic field. Sensing an inductive change may further include sensing and inductive change in response to a metallic dome of a dome switch being deformed by a trigger of the code reader.

The code reader may be self-calibrated by sensing a resting-state inductive value, and storing the resting-state inductive value. Sensing the inductive change may include sensing an instant inductive value, determining a difference inductive value between the instant inductive value and the resting-state inductive value, and in response to the difference inductive value crossing the pre-trigger inductive threshold level, performing the pre-trigger aiming function. Sensing an inductive change may further include sensing and inductive change until a button is pressed to cause the code reader to perform a scan function.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A handheld code reader, comprising:
a main structure;
electro-optics positioned at the main structure, and configured to image or scan machine-readable codes;
a handle extending from the main structure, and configured to enable a user to grip the handle to operate the code reader;
electronics configured to cause the electro-optics to perform (i) a pre-trigger aiming function and (ii) a code reading function;

a trigger configured to be pulled toward the handle by the user;

an antenna in electrical communication with the electronics, and configured to sense an inductive change caused by the user pulling the trigger from a resting position toward a pre-trigger aiming function position; and a switch in electrical communication with the electronics, and positioned to be activated by the trigger being pulled to a scan position such that the trigger reaches the pre-trigger aiming function position before the scan position when starting from the resting position to initiate the pre-trigger aiming function before the code reading function.

2. The code reader according to claim 1, wherein the switch includes a metallic dome portion.

3. The code reader according to claim 2, wherein the antenna is configured to sense an inductive change when the metallic dome is deformed by the trigger.

4. The code reader according to claim 1, wherein the electronics are further configured to enable a user to set a pre-trigger aiming threshold level, which when crossed by the inductive change, causes the electronics to initiate the pre-trigger aiming function.

5. The code reader according to claim 1, further comprising a conductive element positioned on the trigger, and wherein the antenna is configured to sense a change in location of the conductive element.

6. The code reader according to claim 1, wherein the electronics are configured to determine a resting-state inductive value when the trigger is in a resting position, and to store the resting-state inductive value as a reference value.

7. The code reader according to claim 6, wherein the electronics are further configured to:

sense an instant inductive value;

determine a difference inductive value between the instant inductive value and the resting-state inductive value; and in response to determining that the difference inductive value is above a pre-trigger threshold level, initiate the pre-trigger aiming function.

8. A method of operating a code reader, comprising:

sensing an inductive change during operation of a trigger of the code reader; and in response to determining that the inductive change crosses a pre-trigger inductive threshold level, performing a pre-trigger aiming function before initiating a code reading function depending on a position of the trigger during operation of the trigger.

9. The method according to claim 8, wherein sensing an inductive change includes sensing an inductive change in response to an inductive device moving through an electromagnetic field.

10. The method according to claim 8, wherein sensing an inductive change includes sensing and inductive change in response to a metallic dome of a dome switch being deformed by a trigger of the code reader.

11. The method according to claim 8, further comprising self-calibrating the code reader by:

sensing a resting-state inductive value; and storing the resting-state inductive value.

12. The method according to claim 11, wherein sensing the inductive change includes:

sensing an instant inductive value;

determining a difference inductive value between the instant inductive value and the resting-state inductive value; and in response to the difference inductive value crossing the pre-trigger inductive threshold level, performing the pre-trigger aiming function.

13. The method according to claim 11, further comprising enabling a user to set the pre-trigger aiming threshold level.

14. A handheld code reader, comprising:

a main structure;

a handle extending from the main structure;

a trigger configured to be pulled by a finger of a user holding the handle;

a conductive element;

an antenna configured to sense an inductive change caused by the trigger moving the conductive element; and electronics in electrical communication with the antenna, and configured to determine when the inductive change is indicative of a user selecting to activate a pre-trigger aiming function before activating a code reading function based on a position of the trigger being pulled.

15. The code reader according to claim 14, wherein the electronics are configured to determine when the inductive change is indicative of the user selecting to activate a pre-trigger aiming function includes sensing when a difference between a resting-state inductive value and an instant inductive value crosses a pre-trigger inductive threshold level.

16. The code reader according to claim 14, wherein the antenna is a circular antenna positioned at the handle.

17. The code reader according to claim 14, wherein the electronics are further configured to enable a user to set a pre-trigger aiming threshold level, which when crossed by the inductive change, causes the electronics to initiate the pre-trigger aiming function.

18. The code reader according to claim 14, wherein the conductive element is positioned on the trigger.

19. The code reader according to claim 14, further comprising a switch positioned to be pressed by the trigger, and wherein the conductive element is a metal dome on the switch, and wherein the antenna encircles the switch and is configured to sense the inductive change in response to the metal dome being deformed by the trigger.

20. The code reader according to claim 14, wherein the electronics, in response to determining when the inductive change crosses a pre-trigger inductive threshold level, causes a pre-trigger aiming illumination pattern to be projected from the code reader.

* * * * *